(12) United States Patent
Reyssat et al.

(10) Patent No.: US 8,298,649 B2
(45) Date of Patent: Oct. 30, 2012

(54) ARTICLE HAVING A NANOTEXTURED SURFACE WITH SUPERHYDROPHOBIC PROPERTIES

(75) Inventors: Mathilde Reyssat, Somerville, MA (US); Yong Chen, Marcoussis (FR); Anne Pepin, Paris (FR); David Quere, Paris (FR); Claudine Biver, Charenton le Pont (FR); Laurianne Vagharchakian, Charenton le Pont (FR)

(73) Assignees: Essilor International (Compagnie Generale d'Optique), Charenton Le Pont (FR); Centre National de la Recherche Scientifique, Paris (FR)

( * ) Notice: Subject to any disclaimer, the term of this patent is extended or adjusted under 35 U.S.C. 154(b) by 413 days.

(21) Appl. No.: 12/529,704

(22) PCT Filed: Feb. 29, 2008

(86) PCT No.: PCT/FR2008/050350
§ 371 (c)(1),
(2), (4) Date: Sep. 2, 2009

(87) PCT Pub. No.: WO2008/116994
PCT Pub. Date: Oct. 2, 2008

(65) Prior Publication Data
US 2010/0098909 A1 Apr. 22, 2010

(51) Int. Cl.
*D06N 7/04* (2006.01)
(52) U.S. Cl. .................................... 428/141; 428/409
(58) Field of Classification Search .................. None
See application file for complete search history.

(56) References Cited

U.S. PATENT DOCUMENTS

| 6,183,872 | B1 | 2/2001 | Tanaka et al. | 428/429 |
|---|---|---|---|---|
| 6,277,485 | B1 | 8/2001 | Invie et al. | 428/336 |
| 6,852,390 | B2 | 2/2005 | Extrand | 428/156 |
| 8,137,751 | B2 * | 3/2012 | Bhushan et al. | 427/265 |
| 2004/0067339 | A1 * | 4/2004 | Gandon et al. | 428/141 |
| 2005/0136217 | A1 | 6/2005 | Barthlott et al. | 427/280 |
| 2006/0115623 | A1 * | 6/2006 | Aizenberg et al. | 428/141 |

FOREIGN PATENT DOCUMENTS

| EP | 1 249 476 | 10/2002 |
|---|---|---|
| WO | WO 2006/008153 | 1/2006 |
| WO | WO 2006/049020 | 5/2006 |

OTHER PUBLICATIONS

Martines at al., "Superhydrophobicity and superhydrophilicity of regular nanopatterns" *Nanoletters*, 5(10):2097-2103, 2005.

* cited by examiner

*Primary Examiner* — David Sample
*Assistant Examiner* — Nicole T Gugliotta
(74) *Attorney, Agent, or Firm* — Fulbright & Jaworski L.L.P.

(57) ABSTRACT

The invention relates to an article having a nanotextured surface with superhydrophobic properties, comprising an array of vertical tabs, preferably regular, wherein the pillar array fulfils the following conditions: the surface fraction of the pillars $\varnothing_s$ is such that $3\% \leq \varnothing_s \leq 13\%$, preferably $5\% \leq \varnothing_s \leq 12\%$, preferably $5\% \leq \varnothing_s \leq 13\%$, even better $5.5\% \leq \varnothing_s \leq 13\%$, even better $6\% \leq \varnothing_s \leq 13\%$, and better still $8\% \leq \varnothing_s \leq 13\%$; the pitch p of the array is such that $100$ nm $\leq p \leq 250$ nm; the height h of the pillars is such that $100$ nm $\leq h \leq 400$ nm, preferably $250 \leq h \leq 400$ nm, even better $300 \leq h \leq 400$ nm; and the lateral surface of the pillars is inclined at most by an angle of $\pm 20°$, preferably $\pm 10°$ or even better $\pm 5°$, in relation to the vertical axis of the pillars.

20 Claims, 2 Drawing Sheets

ARTICLE HAVING A NANOTEXTURED SURFACE WITH SUPERHYDROPHOBIC PROPERTIES

This application is a national phase application under 35 U.S.C. §371 of International Application No. PCT/FR2008/050350 filed 29 Feb. 2008, which claims priority to French Application No. 0753631 filed 2 Mar. 2007. The entire text of each of the above-referenced disclosures is specifically incorporated herein by reference without disclaimer.

The present invention generally relates to an article, notably an optical article such as an ophthalmic lens, having superhydrophobic properties.

In many applications, notably optics and more particularly ophthalmic optics, it is desirable to make articles having a hydrophobic surface to avoid that water drops remain stuck on the article surface and to facilitate the cleaning thereof. Thus, in the case of ophthalmic lenses, notably spectacle glasses, it is common to deposit a hydrophobic coating onto the glass as a final step, to reduce sticking of water drops, for example raindrops, on the glass surface, which makes the glass less sensitive to dirt and facilitates the cleaning thereof when soiled notably by raindrops.

Conventionally, such hydrophobic coatings, notably in the case of antifouling coatings of ophthalmic lenses, comprise fluorinated compounds, such a fluorosilanes and fluorosilazanes. Such coatings are described, inter alia, in the U.S. Pat. Nos. 6,277,485 and 6,183,872 and in the published International Patent Application WO 2006/049020. The best hydrophobic coatings, when not textured (smooth surface), provide contact angles with water of 110-120°.

Generally, a surface is considered as being hydrophobic when having a contact angle with water >90°. Typically, the conventional hydrophobic surfaces have contact angles with water of more than 90° to 120°. A surface is considered as being superhydrophobic when having a contact angle with water greater than 120°, preferably 130 to 160° or more.

It is known that a smooth hydrophobic surface can be made superhydrophobic by creating roughness thereon. The surface roughness has the effect to trap air inside the structure, a water drop then sitting on a composite surface made of solid and air. This effect, commonly know as "fakir" effect, allows high contact angles (~160° and a rather low contact-angle hysteresis (smaller than 30°, or even than 10°) to be obtained.

For example, the patent application US 2005/0136217 describes a method for preparing self-cleaning surfaces having projections and recesses, wherein the distance between the projections is 0.1 to 200 µm and the height of the projections is 0.1 to 100 µm. More particularly, the method described in the aforesaid application consists in depositing a hydrophobic-material solution, dispersion or emulsion, which, after removing of the solvent, gives rise to tubular-shaped projections. But, besides the fact that the projection heights may be in the nanometer and/or micrometer domain, such heights can significantly vary in a same textured surface, which leads to a great inhomogeneity of the surface hydrophobic properties.

Moreover, in the case of hydrophobic surfaces having micrometer-sized textures, a problem associated with these surfaces is impalement of water drops inside the gaps of the textured surface. Therefore, when water drops of 100 µm or less hit the textured surface, they may penetrate, at least in part, into the gaps between the pillars (impalement effect) and remain trapped therein. When evaporating, the drops leave dirt inside the gaps—dirt which is hard to remove.

The article "Superhydrophobicity and superhydrophilicity of regular nanopatterns", E. Martines et al., NANOLETTERS 2005, Vol. 5, N° 10, 2097-2103, describes superhydrophobic nanostructured surfaces comprising an array of cylindrical pillars having the following characteristics:
- surface fraction of the pillars $Ø_s$ (ratio of the surface area covered by the pillars to the total surface area)=13%,
- height of the pillars h=268 nm,
- pitch of the array (centre-to-centre distance between the pillars) p=300 nm,
- diameter of the pillars d=124 nm.

This article states that, for a given pitch, increasing the shape ratio h/d leads to the best hydrophobic configuration. Thus, an array in which d=117 nm, h=792 nm and p=300 nm has an excellent hydrophobic configuration.

But, very great pillar heights have the drawback that the array is extremely fragile from the mechanical point of view and, therefore, also from the point of view of its hydrophobic properties. Besides, very high pillars may harm the optical qualities of the coating.

It is therefore an object of the present invention to provide an article, notably an optical article such as an ophthalmic lens for spectacles, having a superhydrophobic nanotextured surface remedying the drawbacks of the prior art, being in particular less fragile than the surfaces of the prior art.

Another object of the present invention is an article as defined above having a good resistance to impalement of water drops.

According to the invention, the above goals are reached by providing an article having a nanotextured surface with superhydrophobic properties, comprising an array of vertical pillars, preferably regular, characterized in that the array of pillars fulfils the following conditions:
- the surface fraction of the pillars $Ø_s$ is such that $3\% \leq Ø_s \leq 13\%$, preferably $5\% \leq Ø_s \leq 13\%$, even better $5.5\% \leq Ø_s \leq 13\%$, even better $6\% \leq Ø_s \leq 13\%$, and still better $8\% \leq Ø_s \leq 13\%$;

Among the preferential ranges, it may be mentioned $5\% \leq Ø_s \leq 12\%$, and still better $6\% \leq Ø_s \leq 12\%$; $7\% \leq Ø_s \leq 12\%$; $5\% \leq Ø_s \leq 10\%$; and still better $8\% \leq Ø_s \leq 10\%$.
- the pitch p of the array is such that 100 nm≤p≤250 nm;
- the height h of the pillars is such that 100 nm≤h≤400 nm, preferably 250 nm≤h≤400 nm, and even better 300≤h≤400 nm;

Among the preferred ranges, it may also be mentioned 150 nm≤h≤350 nm; and
- the lateral surface of the pillars makes at most an angle of ±20°, preferably ±10°, and even better ±5°, with respect to the vertical axis of the pillars.

As used herein, "regular" means that the pillars have substantially the same shape and the same height.

Surprisingly, although a diminution of the resistance to water drop impalement would have been expected due to the reduction of height of the pillars, the nanometer-sized arrays according to the invention have an excellent resistance to impalement.

The pillar arrays according to the invention may be periodic or random, and are preferably random.

The base surface may be planar or curved, but it is preferably planar, at least in the spaces between the pillars.

The pillars according to the invention may take various shapes: typically parallelepipeds, cylinders with possibly rounded apex, cones with possibly rounded apex, truncated cones (apex-truncated pillars), pyramids with possibly rounded apex, truncated pyramids.

For rounded-apex cylindrical pillars, the diameter necessary to determine the parameter $Ø_s$ is measured at the base of the pillar rounded-apex and is generally 50 to 100 nm, preferentially greater than 50 nm, even better equal to or greater than 60 nm, or even better the diameter varies from 60 to 90 nm.

By default, the diameter is measured at ¾ of the pillar height from the base.

Referring now to FIG. 3, in the case the pillars 6 are parallelepipeds, pyramids, truncated pyramids, cones or truncated cones, the longer side L or the diameter is measured at ¾ of the height, from the pillar base, and is generally 50 to 100 nm, preferentially greater than 50 nm, even better equal to or greater than 60 nm, or even better the longer side or the diameter varies from 60 to 90 nm.

Typically, in the case of periodic arrays:

$\emptyset_s = a^2/p^2$ for square-section parallelepipedal pillars, $\emptyset_s = \pi d^2/4p^2$ for cylindrical pillars.

In the case of a random array, these formulas may be used with the pitch "p" replaced by the average value of the centre-to-centre distance between the pillars.

In the case of random arrays, the value of $\emptyset_s$ is also calculated by summing the section surface of all the pillars of a representative sample (the section surface being calculated based on the sides and diameters measured as mentioned above), notably a sample of at least 100 pillars, and dividing by the total surface of the sample.

The roughness r of the nanotextured surface is the ratio of the real surface to the exposed surface and is related to the geometrical parameters of the array:

$r = 1 + \pi dh/p^2$ (cylindrical or truncated conical pillars, with d=diameter of the pillars at the base of the rounded apex for cylindrical pillars or at ¾ of the height, from the base of the pillar, for truncated conical pillars, h=height of the pillars and p=pitch of the array).

$r = 1 + 4 ah/p^2$ (square-section parallelepipedal pillars, with a=side of the pillar, h=height of the pillar and p=pitch of the array).

The pillar arrays according to the invention have generally a roughness $r \geq 2$ (which ensures that the system favours the fakir state) and preferably fulfilling the condition:

$$2.5 \leq r \leq 3.5.$$

The Young's angle $\theta_y$ is the theoretical contact angle of a drop of liquid (herein, deionized water) on a smooth (non-textured) surface of a substrate and is defined by the following relation:

$$\cos\theta_y = \frac{\gamma_{SV} - \gamma_{SL}}{\gamma}$$

where $\gamma_{SV}$ and $\gamma_{SL}$ are the surface energies at the solid/vapour and solid/liquid interfaces, respectively, and $\gamma$ is the surface tension of pure water (72 mN/m).

If the Young's angle $\theta_y$ is theoretically well defined, in practice the contact angle is comprised between two limit values. Indeed, if a water drop is swollen, the contact angle firstly increases without the contact line of the drop apparently moving. The contact angle increases until reaching a maximum value $\theta_a$ where the contact line begins to move. This angle $\theta_a$ is called "advancing angle".

On the other hand, if liquid is pumped from a drop, a diminution of the contact angle is observed, down to a minimum value $\theta_r$ where the contact line begins to move back. This angle $\theta_r$ is called "receding angle".

The difference between the advancing angle and the receding angle ($\Delta\theta = \theta_a - \theta_r$) is the contact-angle hysteresis and is often close to $\theta_a$.

The Young's angle $\theta_y$ is between the angles $\theta_a$ and $\theta_r$. When the hysteresis $\Delta\theta \leq 10°$, preferably $\Delta\theta \leq 5°$, it can be admitted that the Young's angle $\theta_y$ of a smooth (non-textured) surface of the material is equivalent to $$\frac{\theta_a + \theta_r}{2}.$$

Within the framework of the present invention, the advancing and receding angles are measured by means of a goniometer equipped with a injection/pumping syringe, by depositing a deionized water drop of 15 μl on the surfaces, then swelling and unswelling the water drop at a rate of 20 μl/minute. Preferably, the angle α, measured at ¾ of the height h of the pillars from the base, that a plane perpendicular to the vertical axis of the pillars makes with respect to the lateral surface of the pillar is such that $\alpha < \theta_y$. Generally, this angle α will be between 70° and 120°.

The pillar height h of the nanotextured surfaces according to the invention being smaller than the visible light wavelengths (400-800 nm), the risk of diffraction and optical problems is reduced.

The nanotextured surface according to the invention may be made on a hydrophobic substrate or a substrate which is coated after the formation of the nanotextured surface of a hydrophobic-material thin layer.

The coating may be total or partial. When partial, it covers the upper part of the pillars. Preferably, the hydrophobic coating covers the whole nanotextured surface.

The thickness of these coatings is generally smaller than or equal to 10 nm, preferably 1 to 10 nm, and even better 1 to 5 nm.

They are generally fluorosilane or fluorosilazane type coatings. They may be obtained by depositing a fluorosilane or fluorosilazane precursor, comprising preferably at least two hydrolyzable groups per molecule. Fluorosilane precursors preferably have fluoropolyether moieties and more preferably perfluoropolyether moieties. These fluorosilanes are well known and are described, inter alia, in the U.S. Pat. Nos. 5,081,192, 5,763,061, 6,183,872, 5,739,639, 5,922,787, 6,337,235, 6,277,485 and EP 0933377.

Fluorosilanes that are particularly suitable for forming hydrophobic coatings are those containing fluoropolyether groups disclosed in U.S. Pat. No. 6,277,485.

These fluorosilanes are given by the general formula:

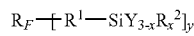

in which Rf is a monovalent or divalent perfluoropolyether group, $R^1$ is a divalent alkylene, arylene or a combination of these two, optionally containing one or several heteroatoms or functional groups and optionally substituted by halogens, and preferably containing 2 to 16 carbon atoms; $R^2$ is a lower alkyl group (that is, an alkyl group in $C_1$-$C_4$); Y is a halogen atom, a lower alkoxy group (that is, an alkoxy group in $C_1$-$C_4$, preferably methoxy or ethoxy), or a lower acyloxy group (that is, —OC(O)$R^3$ where $R^3$ is an alkyl group in $C_1$-$C_4$); x is 0 or 1, or optionally 2; and y is 1 (Rf is monovalent) or 2 (Rf is divalent).

Suitable compounds generally have a number average molecular weight of at least 1000. Preferably, Y is a lower alkoxy group and Rf is a perfluoropolyether group.

Other recommended fluorosilanes are those with the formula:

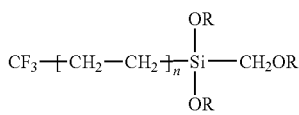

where n=5, 7, 9 or 11 and R is an alkyl group, preferably in C1-C10 such as —CH$_3$, —C$_2$H$_5$ and —C$_3$H$_7$;

CF$_3$(CF$_2$)$_5$CH$_2$CH$_2$Si(OC$_2$H$_5$)$_3$ ((tridecafluoro-1,1,2,2-tetrahydro)octyl-triethoxysilane);

CF$_3$CH$_2$CH$_2$SiCl$_3$; CF$_3$—CF$_2$—(CH$_2$CH$_2$)$_{n'}$—SiCl$_3$; and

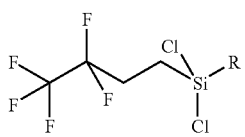

where n'=7 or 9 and R" is as defined above.

Compositions containing fluorosilanes equally recommended for preparing hydrophobic and/or oleophobic coatings are disclosed in U.S. Pat. No. 6,183,872. They contain fluoropolymers with organic groups bearing Si groups, represented by the following general formula and with a molecular weight of $5.10^2$ to $1.10^5$:

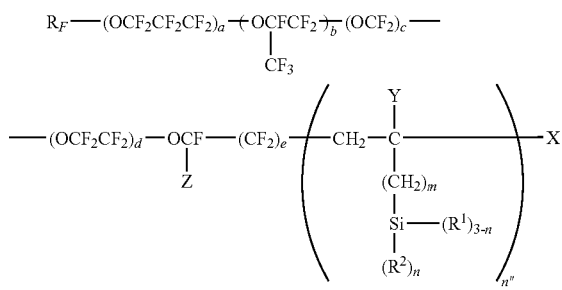

wherein Rf represents a perfluoroalkyl group; Z represents a fluoro or trifluoromethyl group; a, b, c, d and e each represent, independently from each other, 0 or an integer greater than or equal to 1, provided that the sum a+b+c+d+e is not less than 1 and that the order of the repeated units figuring between the brackets indexed as a, b, c, d and e is not limited to the order represented; Y represents H or an alkyl group comprising from 1 to 4 carbon atoms; X represents a hydrogen, bromine or iodine atom; R$^1$ represents a hydroxyl group or a hydrolysable group; R$^2$ represents a hydrogen atom or a monovalent hydrocarbon group; m represents 0, 1 or 2; n represents 1, 2 or 3; and n" represents an integer at least equal to 1, preferably at least equal to 2.

Compositions for making fluorinated hydrophobic coatings such as described above are sold under the names KP 801 M® (Shin-Etsu Chemical), OPTOOL DSX® (Daikin Industries) and KY 130® (Shin-Etsu Chemical). Obviously, mixtures of these compositions can be used.

Of course, in the case of optical articles, the nanotextured surface may be formed on a lens substrate, bare or coated with one or several functional coatings such as shock-resistant, abrasion-resistant and/or scratch-resistant and anti-reflection coatings. The lens may also be coloured or photochromic.

It is also possible to prepare the nanotextured surface according to the invention and to later transfer it onto a mould, so that the obtained mould comprises a surface which is the reverse replica of the nanostructured surface.

The obtained mould, which can be a rigid mould, or preferentially a flexible mould, will then be itself used to transfer a replica of the nanostructured surface onto an optical article, typically by applying a hardenable composition to the surface of the article or of the microstructured mould and pressing the mould and the article against one another, and then hardening the composition.

It is also possible to use the nanostructured-surface mould in operations for manufacturing moulded optical articles, in which the substrate material is casted into the nanostructured-surface mould and hardened therein.

The nanostructured surface of the mould may have been coated beforehand with one or more coatings such as hydrophobic and/or oleophobic, abrasion-resistant, shock-resistant coatings.

Methods of transferring nanostructures are described in the U.S. Pat. No. 6,491,851 and EP 1,551,611.

The nanotextured surfaces according to the invention prove to be particularly interesting as rain-repellent surfaces, i.e. surfaces that help draining the rain drops and avoid impalement thereof on the surface, which thus reduces the deposition of dust onto the surface. Such surfaces are particularly advantageous for optical articles, notably ophthalmic lenses and in particular spectacle glasses, due to their properties of low raindrop adherence and fast drop-draining ability.

Therefore, the invention also relates to the use of a nanostructured surface as described above to provide rain-repellent property to the surface of an article, notably an optical article such as an ophthalmic lens and more specifically a spectacle glass.

The following of the description makes reference to the appended figures, in which.

Figure 1:
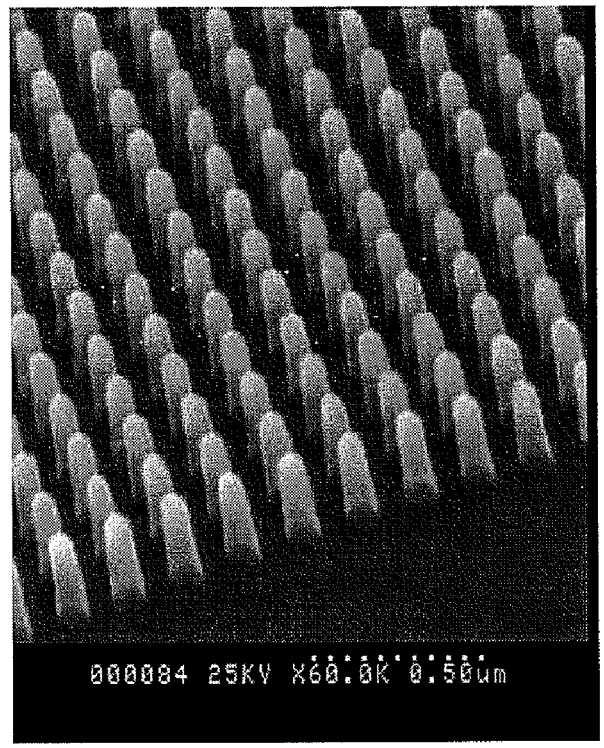
FIG. 1 is a microphotography of a nanotextured silicon surface according to the invention (array #1)

The following example illustrates the present invention in a non limitative way.

Example

A surface of a sample silicon-substrate has been provided with a nanotextured periodic array, coated with a layer of hydrophobic material according to the invention, having the following characteristics:

Array #1:
pitch (p)=200 nm
surface fraction of the pillars $(Ø_s)=πd^2/4p^2=11\%$
roughness (r)=3.0
pillar geometry: cylinder with round apex
diameter (d)=75 nm
height (h)=350 nm The sample-substrate is a 3 cm×3 cm square, with a 1 cm$^2$ textured portion in the centre thereof.

Manufacturing of the Textured Array

1. A silicon wafer is spin-coated with a 30-g/l poly(methyl methacrylate) (PMMA) solution in methylisobutylketone, for 30 s, at a rotational speed of 4000 rpm and an acceleration of 3000 rpm. The final thickness of the obtained coating is 150 nm.

2. The coated wafer is placed in an oven for 30 minutes, at 180°.

3. The coated face of the wafer is then irradiated according to the desired pattern by means of a computer-controlled electronic beam (electronic masking device Leica).

4. The irradiated layer is then developed for 45 s in a ⅓-volume methylisobutylketone/isopropanol solution.

5. A 40-nm chromium layer is then deposited (conventional vacuum deposition).

6. The PMMA layer is removed by acetone treatment. The chromium deposited on the silicon remains intact, whereas the chromium above the resin is removed along with the latter.

7. The silicon is etched by reactive ion etching (RIE), under the control of a DPSI program (4 sccm $SF_6$–8 sccm $CHF_3$–pressure=10 mTorr–RF power=15 watts) for 7 minutes, at an etching speed of 50 nm/min to obtain an etching depth of 350 nm (sccm=standard cubic centimetres per minutes at 0° C. and 101.325 kPa.)

8. The chromium layer is chemically removed by dipping the sample into a solution commercially available as Cr-etch® (Chromium Etch 3144 (Honeywell), mixture of perchloric acid and ammonium-cerium(IV) nitrate).

Deposition of the Hydrophobic Thin Layer

A 2-nm-geometrical-thickness layer of hydrophobic material (OPTOOL DSX®) is then deposited in the following conditions:
vacuum pumping of the chamber to a pressure of $3.10^{-5}$ mbar;
low-energy argon-ion bombarding: Ie=0.5 A, V=80 V, for 1 minute;
Joule-effect evaporation of OPTOOL DSX® (Evaporation rate: 0.40 nm/s), with a slow final venting (4 minutes).

Measurement of Contact Angles with Water

The contact angles of the nanotextured surface according to the invention are measured as described above. The results are given in Table I below. By way of comparative example, the contact angles with water of the non-nanotextured surface of a silicon wafer coated with the hydrophobic material are given (measurements performed by means of DIGIDROP GBX, manual mode–triple-point speed=0).

TABLE I

|  | Advancing angle | Receding angle | Hysteresis |
| --- | --- | --- | --- |
| Array #1 | 160° | 137° | 23° |
| Silicon substrate | 121° | 117.4° | 3.6° |

The nanostructure has the interest to very significantly increase the advancing and receding angles. The hysteresis remains modest, which shows that we are in a Cassie state. In the case of a Wenzel state, the hysteresis would be about 100 to 140°. Such receding angles are never obtained with planar surfaces. Such advancing and receding angle values allow the water drops to remain spherical and are sufficient so that the latter rebound when they drop onto these surfaces. The drops are then easily drained, rolling as soon as the surface is inclined.

Resistance to Drop Impact

The diagram of the experimental arrangement used for the drop-impact tests is shown in FIG. 1. The drops are released from a syringe driven by a syringe-driver. The observation is made with a fast camera.

Figure 2:
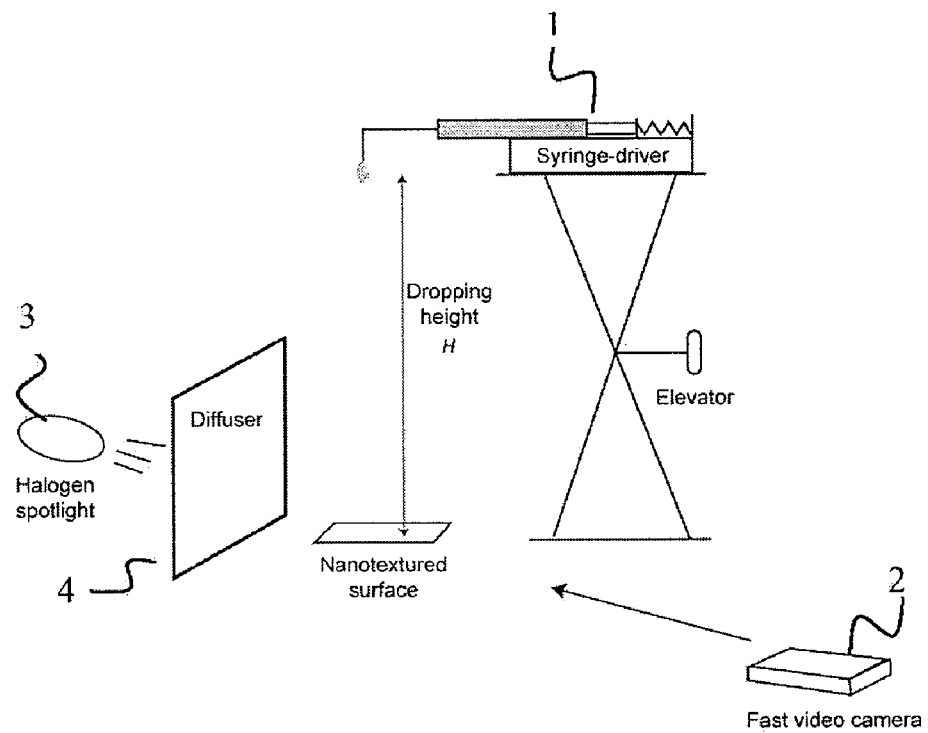
FIG. 2 is a diagram of the device for determining the resistance to drop impact.
Figure 3:
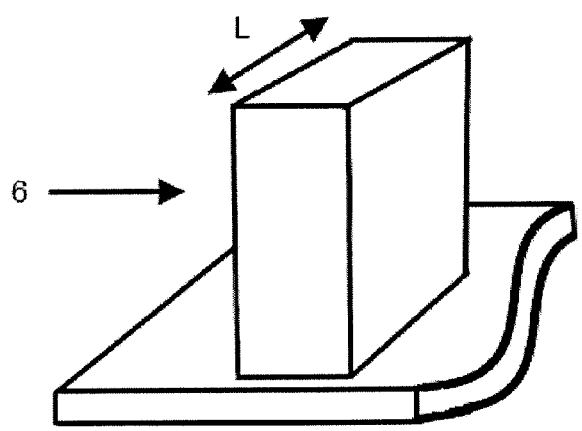
FIG. 3 is a diagram of one embodiment of the pillars 6.

A syringe 1 driven by a syringe-driver allows the release of calibrated-size drops. The syringe is arranged so that the drops fall onto the sample by a height H, as schematically shown in FIG. 2.

Observation of the impact is made with a fast camera taking 2 to 1000 images per second. The pictures are taken in profile, with the light 3 arranged behind a diffuser 4, symmetrically with respect to the camera.

Impacts of drops with a radius varying from 1.1 to 2 mm have been performed from different heights (from 3 cm to 1 cm) onto the nanotextured surface, and rebounds have always been observed, even for drops released from 1 m high. The water does not enter into the surface but rebounds.

Evaporation Test

A drop placed on a nanotextured surface of the example evaporates while remaining in fakir state until the resolution limit of the test is reached, which is 20 μm (this drop size is that of macroscopic drops a little larger than vapour). The evolution of these drops is observed with a binocular arranged horizontally so as to see the drop in profile.

The observed behaviour is very different from that observed with larger structures in which drop impalement is noticed for sizes smaller than one hundred microns.

In conclusion: no impalement of drops is observed in the nanotextures of the example.

The invention claimed is:

1. An article having a nanotextured surface with superhydrophobic properties, comprising an array of vertical pillars comprising a lateral surface, a vertical axis, and apex, wherein the array of pillars comprises:
a surface fraction of the pillars ($Ø_s$) of from 3% to 13;
a pitch (p) of the array of 100 nm to 250 nm; and
a height (h) of the pillars of 100 nm to 400 nm;
wherein the lateral surface of the pillars makes at most an angle of ±20° with respect to the vertical axis of the pillars.

2. The article of claim 1, wherein the vertical pillars are further defined as regular.

3. The article of claim 1, wherein the height of the pillars is from 150 to 350 nm.

4. The article of claim 1, wherein the surface fraction is from 5% to 12%.

5. The article of claim 4, wherein the surface fraction is 5% to 10%.

6. The article of claim 5, wherein the surface fraction is 8% to 10%.

7. The article of claim 4, wherein the pillars are parallelepipeds, cylinders, frustums of cone, or frustums of pyramid.

8. The article of claim 7, wherein a longer side or diameter of the pillars varies from 50 nm to 100 nm.

9. The article of claim 8, wherein the longer side or the diameter of the pillars varies from 60 to 90 nm.

10. The article of claim 1, wherein the apexes have a rounded shape.

11. The article of claim 1, wherein the nanotextured surface has a roughness (r) of at least 2.

12. The article of claim 11, wherein the nanotextured surface has a roughness (r) from 2.5 to 3.5.

13. The article of claim 1, wherein the nanotextured surface is at least partially coated with a layer of hydrophobic material.

14. The article of claim 13, wherein the thickness of the layer is less than or equal to 10 nm.

15. The article of claim 14, wherein the thickness of the layer is greater than 1 nm.

16. The article of claim 15, wherein the thickness of the layer is less than or equal to 5 nm.

17. The article of claim 1, further defined as an optical article.

18. The article of claim 17, further defined as an ophthalmic lens.

19. The article of claim 1, wherein the nanotextured surface is an antifouling layer.

20. A method of providing rain-repellant properties to a article comprising:
obtaining an article; and
applying to the article an array of pillars as defined in claim 1.

* * * * *